United States Patent
Kimuro

(10) Patent No.: US 9,454,452 B2
(45) Date of Patent: Sep. 27, 2016

(54) INFORMATION PROCESSING APPARATUS AND METHOD FOR MONITORING DEVICE BY USE OF FIRST AND SECOND COMMUNICATION PROTOCOLS

(71) Applicant: FUJITSU LIMITED, Kawasaki-shi, Kanagawa (JP)

(72) Inventor: Eisuke Kimuro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 14/457,639

(22) Filed: Aug. 12, 2014

(65) Prior Publication Data
US 2015/0127996 A1 May 7, 2015

(30) Foreign Application Priority Data
Nov. 1, 2013 (JP) ................................. 2013-228674

(51) Int. Cl.
G06F 11/30 (2006.01)
G06F 11/20 (2006.01)

(52) U.S. Cl.
CPC ........ G06F 11/3058 (2013.01); G06F 11/2005 (2013.01); G06F 11/2007 (2013.01); G06F 11/2012 (2013.01); G06F 11/3031 (2013.01); G06F 11/3055 (2013.01)

(58) Field of Classification Search
None
See application file for complete search history.

(56) References Cited

U.S. PATENT DOCUMENTS

| | | | | |
|---|---|---|---|---|
| 7,966,441 B2* | 6/2011 | Huang | ................... | H04L 41/08 709/218 |
| 8,935,567 B1* | 1/2015 | Martin | ..................... | G06F 3/06 714/42 |
| 2006/0179200 A1 | 8/2006 | Shimazaki | | |
| 2008/0086580 A1* | 4/2008 | Zhang | ................... | H04L 12/40 710/107 |

(Continued)

FOREIGN PATENT DOCUMENTS

| | | |
|---|---|---|
| JP | 10-161896 | 6/1998 |
| JP | 2006-215938 | 8/2006 |
| JP | 2008-176682 | 7/2008 |

*Primary Examiner* — Gabriel Chu
*Assistant Examiner* — Paul Contino
(74) *Attorney, Agent, or Firm* — Staas & Halsey LLP

(57) ABSTRACT

An information processing apparatus includes a monitoring device including a first communication unit and a first processor. The first communication unit is configured to perform first communication using a first protocol and perform second communication using a second protocol different from the first protocol. The first processor is configured to conduct the first communication via the first communication unit to obtain first data and conduct first determination to determine whether the first data is obtained through the first communication. The first processor is configured to conduct, when it is determined that the first data is not obtained through the first communication, the second communication via the first communication unit to obtain the first data and conduct second determination to determine whether the first data is obtained through the second communication. The first processor is configured to output information on the basis of a determination result of the second determination.

5 Claims, 6 Drawing Sheets

(56) References Cited

U.S. PATENT DOCUMENTS

| | | | |
|---|---|---|---|
| 2008/0177912 A1 | 7/2008 | Onda | |
| 2009/0276666 A1* | 11/2009 | Haley | G06F 11/2007 714/47.2 |
| 2010/0238796 A1* | 9/2010 | Supalov | G06F 11/2012 370/225 |
| 2012/0017074 A1* | 1/2012 | Kelly | G06F 9/4411 713/100 |
| 2012/0023210 A1* | 1/2012 | Lai | G06F 9/46 709/223 |
| 2012/0039165 A1* | 2/2012 | Brown | G06F 11/2017 370/220 |
| 2014/0195657 A1* | 7/2014 | Bhatia | H04L 41/04 709/223 |
| 2014/0229758 A1* | 8/2014 | Richardson | G06F 11/2007 714/4.11 |
| 2014/0280814 A1* | 9/2014 | Maity | H04L 41/022 709/223 |
| 2014/0280947 A1* | 9/2014 | Christopher | H04L 41/08 709/226 |
| 2015/0039949 A1* | 2/2015 | Brockerhoff | G06F 13/4282 714/712 |
| 2015/0143160 A1* | 5/2015 | Diederich | G06F 8/65 714/4.11 |
| 2015/0304233 A1* | 10/2015 | Krishnamurthy | H04L 47/762 709/226 |
| 2015/0309553 A1* | 10/2015 | Huang | G06F 1/324 713/322 |

* cited by examiner

FIG. 4

| SENSOR NAME | SENSOR VALUE | TIME STAMP |
|---|---|---|
| FAN 1 PSU | OK | 1362661727 |
| FAN 2 PSU | Not present | 1362661729 |
| FAN 1 SYS | OK | 1362661730 |
| FAN 2 SYS | OK | 1362661730 |
| FAN 3 SYS | OK | 1362661731 |
| FAN 4 SYS | Not present | 1362661734 |
| Ambient Temp. | OK | 1362661734 |
| Systemboard 1 Temp. | OK | 1362661735 |
| Systemboard 2 Temp. | OK | 1362661735 |
| CPU 1 Temp. | OK | 1362661736 |
| ⋮ | ⋮ | ⋮ |

INFORMATION PROCESSING APPARATUS AND METHOD FOR MONITORING DEVICE BY USE OF FIRST AND SECOND COMMUNICATION PROTOCOLS

CROSS-REFERENCE TO RELATED APPLICATION

This application is based upon and claims the benefit of priority from the prior Japanese Patent Application No. 2013-228674 filed on Nov. 1, 2013, the entire contents of which are incorporated herein by reference.

FIELD

The embodiments discussed herein are related to an information processing apparatus and a method for monitoring a device.

BACKGROUND

A device (management device) dedicated to management may be mounted in an information processing apparatus. The management device is generally adapted to allow a remote operation for management to monitor the state of hardware installed in the information processing apparatus. The operation for management includes, for example, turning ON/OFF the power and restarting. Since the management device is equipped with such functions, the management device is mounted in most servers which are representative of information processing apparatuses.

An interface specification has been established in order to remotely perform the operation and monitoring of the state of the information processing apparatus. An intelligent platform management interface (IPMI) is the standard interface specification. The IPMI assumes inter-integrated circuit (I2C) as a communication specification. Hereinafter, a management device compatible with the IPMI is referred to as a baseboard management controller (BMC).

In the related art, the BMC is allowed to perform communication only through the I2C by the IPMI. Generally, the BMC is a large scale integration (LSI) component and the state thereof may not be determined from an outer appearance. Therefore, communication using the IPMI becomes the only way to check for the state of the BMC.

Recently, the functions required for the BMC are being increased. Therefore, the scale of a program executed by the BMC is being increased as well.

As the scale of a program is being increased, the possibility of a trouble (e.g., bugs) occurring in the program is increased. The trouble of the program may cause an erroneous operation or freezing of the BMC. When the BMC does not normally operate, the state of a server in which the BMC is mounted may not be checked. Therefore, the server needs to be stopped. However, it is strongly required that the stopping of the server is avoided. Therefore, a necessity of monitoring the BMC itself is being increased in recent years.

The state of the BMC may be checked through the communication using the IPMI. However, an error may be caused in a communication route itself of the I2C, which is used for the communication, or in an interface for communication via the I2C. When the communication is not performed due to the error related with the communication route, it is considered that the BMC is not normally operating, even if the BMC itself is normally operating. As a result, it may be necessary to stop the server. In this regard, it is important to more appropriately cope with the occurrence of an error related with the communication route by monitoring the BMC.

Related techniques are disclosed in, for example, Japanese Laid-Open Patent Publication No. 2008-176682, Japanese Laid-Open Patent Publication No. 2006-215938, and Japanese Laid-Open Patent Publication No. 10-161896.

SUMMARY

According to an aspect of the present invention, provided is an information processing apparatus including a monitoring device. The monitoring device includes a first communication unit and a first processor. The first communication unit is configured to perform first communication using a first protocol. The first communication unit is configured to perform second communication using a second protocol different from the first protocol. The first processor is configured to conduct the first communication via the first communication unit to obtain first data. The first processor is configured to conduct first determination to determine whether the first data is obtained through the first communication. The first processor is configured to conduct, when it is determined that the first data is not obtained through the first communication, the second communication via the first communication unit to obtain the first data. The first processor is configured to conduct second determination to determine whether the first data is obtained through the second communication. The first processor is configured to output information on basis of a determination result of the second determination.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of contents of data obtained based on SDR information;

DESCRIPTION OF EMBODIMENTS

Hereinafter, an embodiment will be described in detail with reference to the drawings.

Figure 1:
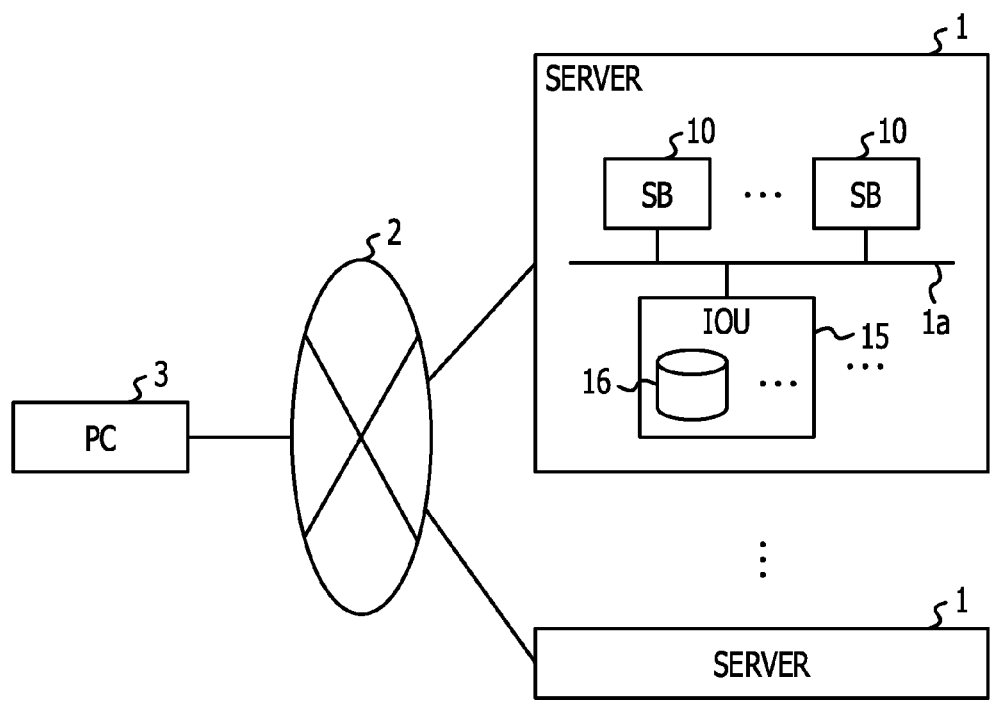
FIG. 1 is a diagram illustrating an exemplary configuration of an information processing system which is built using an information processing apparatus according to an embodiment.

FIG. 1 is a diagram illustrating an exemplary configuration of an information processing system which is built using an information processing apparatus according to the present embodiment.

An information processing apparatus according to the present embodiment is implemented as a server 1. A plurality of servers 1 are connected to a network 2. A terminal device (PC: personal computer) 3, which allows an operator to monitor/manage the servers 1, is also connected to the network 2.

Each server 1 is configured such that a plurality of system boards (SBs) 10 and a plurality of input/output units (IOUs) 15 are connected to one another via a crossbar 1a. A plurality of hard disk drives 16 is mounted in each IOU 15.

Figure 2:
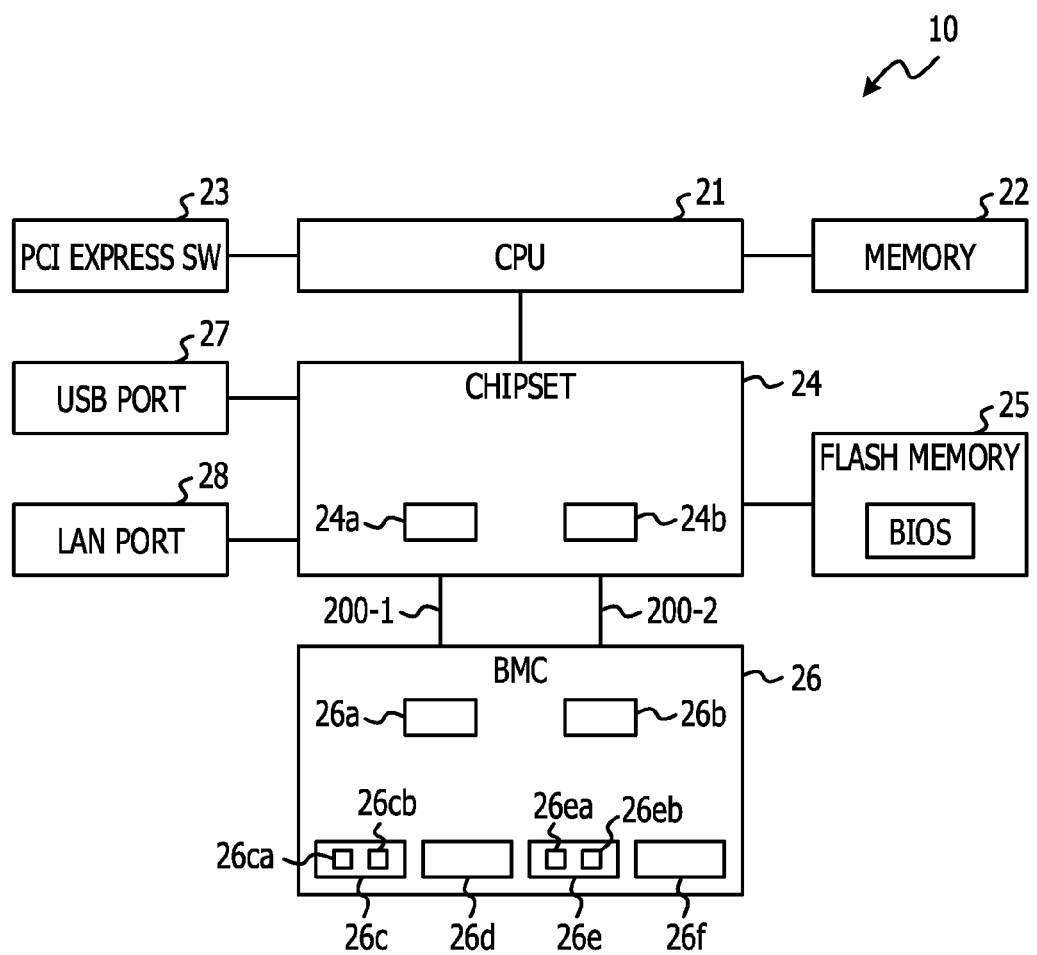
FIG. 2 is a diagram illustrating an exemplary configuration of a system board mounted in an information processing apparatus according to an embodiment.

Each SB 10 is a processing module that serves as an information processing apparatus and executes an application program. As illustrated in FIG. 2, each SB 10 includes, for example, a central processing unit (CPU) 21, a memory (memory module) 22, a peripheral components interconnect (PCI) express switch 23, a chipset 24, a flash memory 25, a BMC 26, a universal serial bus (USB) port 27, and a local area network (LAN) port 28. The memory 22, the PCI express switch (SW) 23, and the chipset 24 are connected to the CPU 21. In addition to the CPU 21, the flash memory 25, the BMC 26, the USB port 27, and the LAN port 28 are connected to the chipset 24.

A basic input/output system (BIOS) which is executed by the CPU 21 is stored in the flash memory 25. When the power is turned ON, the CPU 21 reads the BIOS from the flash memory 25 through the chipset 24 into the memory 22 and executes the BIOS.

A processing module other than the SB 10 and the IOU 15 may be added to the server 1. The PCI express switch 23 may be used to communicate with the added processing module (or a component mounted in the processing module).

The chipset 24 includes various interfaces. Therefore, the chipset 24 provides, to the CPU 21, a communication environment which enables communication through various interfaces. The USB port 27 and the LAN port 28 illustrated in FIG. 2 are connection units to connect corresponding cables. In reality, however, other ports may also exist in the SB. For example, one of the other ports is a port (crossbar port) for being connected with the crossbar 1a. The LAN port 28 is provided for communication with the network 2.

The CPU 21 which has initiated the BIOS reads an operating system (OS) and furthermore the application program from the hard disk drive 16 on a previously determined IOU 15 through the chipset 24 and stores the OS and the application program in the memory 22. Thereafter, the CPU 21 initiates the OS and then initiates the application program.

The BMC 26 and the chipset 24 are connected by two transmission paths 200-1 and 200-2 (collectively referred to as transmission paths 200). The chipset 24 includes a first interface unit 24a and a second interface unit 24b for the communication using the two transmission paths 200.

The transmission path 200-1 is the I2C bus and used for data transmission by the IPMI. The transmission path 200-2 is a transmission path different from the I2C bus, and the data transmission according to a communication protocol different from a communication protocol of the I2C bus is performed through the transmission path 200-2. The type of transmission path 200-2 is not specifically limited. The first interface unit 24a implements communication (data transmission) through the transmission path 200-1 and the second interface unit 24b implements communication through the transmission path 200-2.

The BMC 26 is an LSI component which serves as a management device compatible with the IPMI and enables a remote operation and monitoring of a state of the server 1.

Each SB 10 is adapted to allow the power to be individually turned ON/OFF by the BMC 26 mounted thereon.

The BMC 26 includes a first interface unit 26a, a second interface unit 26b, a read-only memory (ROM) 26c, a processor 26d, a memory 26e, and an input/output (JO) interface unit 26f.

The first interface unit 26a implements communication (data transmission) through the transmission path 200-1, and the second interface unit 26b implements communication through the transmission path 200-2. The ROM 26c stores therein a program 26ca executed by the processor 26d and sensor data record (SDR) information 26cb. Information on sensors mounted in the server 1 and information on a type of field-replaceable unit (FRU) are defined in the SDR information 26cb.

Figure 3:
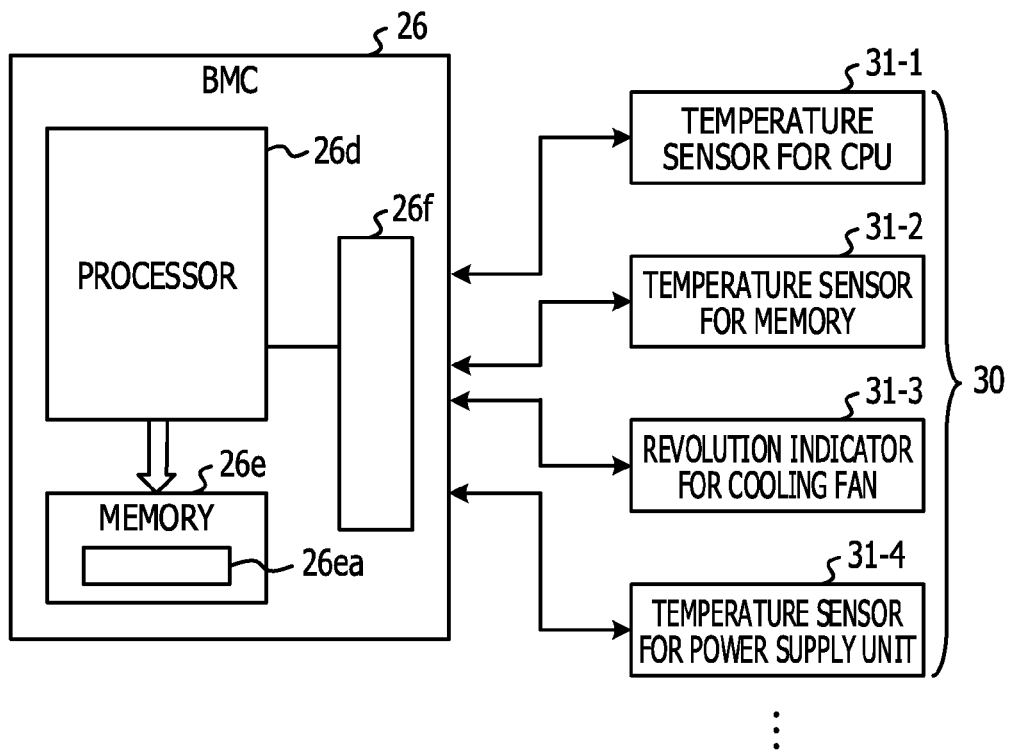
FIG. 3 is a diagram illustrating an example of sensors connected to a BMC.

The IO interface unit 26f is used to input a value output from various sensors. FIG. 3 is a diagram illustrating an example of sensors connected to the BMC.

A temperature sensor 31-1 for detecting a temperature is provided for the CPU 21 on each SB 10. Temperature sensors 31-2 and 31-4 are also provided for the memory 22 and a power supply unit, respectively. A revolution indicator 31-3 for measuring the number of revolutions per unit time is provided as a sensor for a cooling fan. In addition, for example, a voltage sensor (not illustrated) is provided for the CPU 21 and the memory 22. These sensors are collectively referred to as sensors 31. The various sensors 31 form a hardware sensor group 30 and are connected to the IO interface unit 26f of the BMC 26.

A value (sensor value) obtained from each of the sensors 31 forming the hardware sensor group 30 is generally stored in the memory 26e as a value of the sensor defined in the SDR information 26cb. Therefore, a region 26ea (hereinafter, referred to as "obtained data storing region") for storing a sensor value is secured in the memory 26e. Contents of data including the stored sensor value are illustrated in FIG. 4, for example.

In FIG. 4, three pieces of information of a "sensor name", a "sensor value", and a "time stamp" for every sensor 31 are illustrated. The "sensor name" is information allocated to each sensor 31 to identify the sensor 31. For example, each of "FAN1 PSU" and "FAN1 SYS" indicates a revolution indicator 31 of a fan, to which a number "1" is allocated, for cooling down the power supply unit, and a revolution indicator 31 of a fan, to which a number "1" is allocated, for cooling down the SBs 10 and the IOUs 15, respectively. Each of "Ambient Temp." and "Systemboard1 Temp." indicates a temperature sensor 31 for detecting an environmental temperature of the server 1 and a temperature sensor 31 for detecting a temperature of the SB 10, respectively.

The "sensor value" is a value of a corresponding sensor 31 or information indicating a result of comparing the value of the sensor 31 with a threshold value determined in the SDR information 26cb. "OK" represented in FIG. 4 indicates that the comparison result with the threshold value is a desirable result. Generally, the value itself of the sensor 31 is stored as well. "Not present" indicates that a corresponding sensor 31 is not present.

The "time stamp" is information indicating a time when the sensor value is obtained. The value of a timer provided in the processor 26d is used as the time stamp.

The processor 26d executes the program 26ca stored in the ROM 26c to obtain a value of each of the sensors 31 through the IO interface unit 26f, for example, each time when a predetermined time elapses. The processor 26d stores the obtained value itself of the sensor 31 or the comparison result in the obtained data storing region 26ea secured in the memory 26e. The predetermined time is, for example, 60 seconds. Hereinafter, the "value of the sensor 31" is used as a general term of the value itself and the comparison result, unless otherwise mentioned.

The processor 26d secures the obtained data storing region 26ea in the memory 26e for storing the sensor value and also secures another storing region. The sensor value is also stored in the other storing region. Hereinafter, the other storing region will be referred to as a "register region".

The program 26ca executed by the processor 26d includes a sub program (hereinafter, referred to as a "redundant program") for maintaining a redundancy in the monitoring of a state of the BMC 26, in addition to a sub program (hereinafter, referred to as a "management program") for managing the communication using the IPMI. The management program and the redundant program are independently executed and implement communication using different interfaces. That is, the redundant program implements communication using the second interface unit 26b. The management program implements to obtain the value of each of the sensors 31 forming the hardware sensor group 30 and store the obtained value in the obtained data storing region 26ea.

A sub program (hereinafter, referred to as a "monitoring program") for monitoring the state of the BMC 26 is installed in a program which is read from the IOU 15 to be executed by the CPU 21, for example, in the OS. Therefore, in the present embodiment, the CPU 21 which executes the OS operates as a monitoring device which monitors the state of the BMC 26. In this regard, the server 1 which is an information processing apparatus according to the present embodiment is implemented by mounting the BMC 26 which is a management device according to the present embodiment and the monitoring device according to the present embodiment.

In a case of monitoring the state of the BMC via the communication through one transmission path, when an error occurs in the transmission path or the interface unit for communication using the transmission path, the communication with the BMC is not available even though the BMC normally operates. Therefore, in order to suppress the possibility that the state of the BMC is not monitored due to the error related with the transmission path, it is required to use a plurality of transmission paths which perform data transmission via different interfaces. Even when a plurality of transmission paths which perform data transmission by different interfaces are connected to a plurality of BMCs, in the communication routes in which the same transmission path is used for the data transmission during the transmission, a possibility that the state of the BMC is monitored due to the presence of the commonly used transmission path is increased. Since many cables are connected to the SBs 10, the number of connected cables is desirably suppressed.

Therefore, in the present embodiment, the state of the BMC 26 mounted on each of the SBs 10 is monitored by the CPU 21 mounted on the same SB 10, and the CPU 21 and the BMC 26 are connected with each other through two communication routes. When the state of the BMC 26 on the SB 10 is monitored by the CPU 21 on the same SB 10, increasing of the number of cables that needs to be connected to the SB 10 may be avoided or suppressed.

In the present embodiment, the CPU 21 and the BMC 26 are connected through a communication route including the chipset 24 and the transmission path 200-1, and a communication route including the chipset 24 and the transmission path 200-2. Therefore, the same transmission path is provided between the CPU 21 and the chipset 24. The fact that the data is not normally transmitted between the CPU 21 and the chipset 24 indicates that a very serious error occurs in the SB 10. As long as the SB 10 is normally operated on the assumption of normal data transmission between the CPU 21 and the chipset 24, there is in fact no need to consider the reliability of data transmission performed between the CPU 21 and the chipset 24. Therefore, the same transmission path is provided between the CPU 21 and the chipset 24 in the two communication routes.

Figure 5:
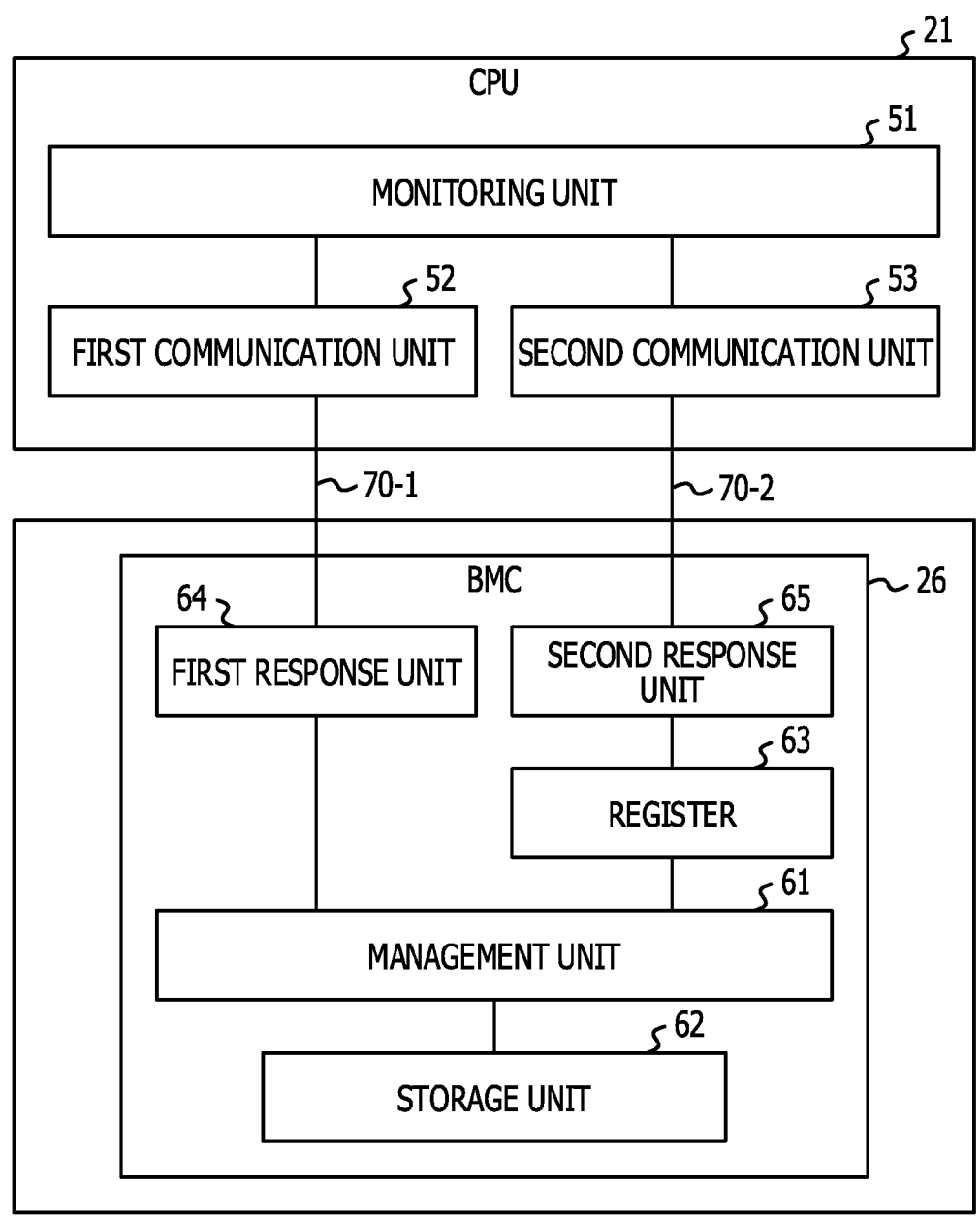
FIG. 5 is a diagram illustrating an exemplary functional configuration of a BMC which is a management device according to an embodiment and a monitoring device according to an embodiment.

FIG. 5 is a diagram illustrating an exemplary functional configuration of a BMC which is a management device according to an embodiment and a monitoring device according to an embodiment. On the assumption that a monitoring device according to the present embodiment is implemented only by a CPU 21, in FIG. 5, reference numeral "21" is denoted. An OS including a monitoring program is stored on the memory 22 to be executed so that an actual monitoring device includes at least the memory 22 in addition to the CPU 21.

As illustrated in FIG. 5, the BMC 26 which is a management device according to the present embodiment includes a management unit 61, a storage unit 62, a register 63, a first response unit 64, and a second response unit 65 as functional components. The monitoring device (CPU) 21 according to the present embodiment includes a monitoring unit 51, a first communication unit 52, and a second communication unit 53 as functional components.

The monitoring device 21 and the BMC 26 are connected through two communication routes 70-1 and 70-2. The communication route 70-1 is a communication route including a chipset 24 and a transmission path 200-1. The communication route 70-2 is a communication route including a chipset 24 and a transmission path 200-2.

The management unit 61 is a functional unit which responds to a request through communication via the IPMI and obtains a value of each of the sensors 31 forming a hardware sensor group 30. The management unit 61 is implemented by, for example, a ROM 26c, a processor 26d, a memory 26e, and an IO interface unit 26f. The storage unit 62 is used for storing, for example, SDR information 26cb and the value of each of the sensors 31. The storage unit 62 corresponds to the memory 26e illustrated in FIG. 2.

The first response unit 64 is a functional unit which performs communication through the communication route 70-1. The first response unit 64 is implemented by, for example, a first interface unit 26a, an ROM 26c, a processor 26d, and a memory 26e.

The register 63 is used for storing the value of each of the sensors. The register 63 corresponds to a memory 26e, more specifically, to a register region 26eb on the memory 26e.

The second response unit 65 is a functional unit which performs communication through the communication route 70-2. The second response unit 65 is implemented by, for example, a second interface unit 26b, the ROM 26c, the processor 26d, and the memory 26e.

The management unit 61 and the first response unit 64 are implemented when the processor 26d executes the management program. The second response unit 65 is implemented when the processor 26d executes the redundant program.

The management unit 61 obtains values of sensors 31 forming the hardware sensor group 30 at a predetermined interval of time and a value of a timer (time information) used as a time stamp. The management unit 61 stores the obtained values of the sensors 31 and the value of the timer in both the storage unit 62 and the register 63.

In the data stored in the storage unit 62 and the register 63, even when the value of a sensor 31 is the same, the time stamp related to the value varies. In the present embodiment, in order to check whether the BMC 26 normally operates, the time stamp is used, in addition to the values of the sensors 31.

The monitoring unit 51 of the monitoring device 21 is a functional unit which monitors to determine the state of the BMC 26 through the communication via the communication route 70-1, furthermore, through the communication via the communication route 70-2.

The first communication unit 52 is a functional unit which performs communication with the BMC 26 through the communication route 70-1. Therefore, the communication is performed using the IPMI.

The second communication unit 53 is a functional unit which performs communication with the BMC 26 through the communication route 70-2. Therefore, the communication is performed using a communication specification and an address which are different from those of the IPMI.

The monitoring unit 51 requests the BMC 26 to transmit the sensor values, for example, at a predetermined interval of time. The request is first performed using the first communication unit 52, and when the first communication unit 52 does not receive the sensor values as a response, the second communication unit 53 is used for the request. As described above, if necessary, the sensor values are requested using different communication route 70-2 so that it may be checked, regardless of the occurrence of the error related to the communication route 70-1, whether the BMC 26 normally operates.

In the BMC 26, when the first response unit 64 receives the request to transmit the sensor values, the management unit 61 reads the sensor values stored in the storage unit 62 and transmits the read sensor values (FIG. 4) from the first response unit 64 as a response. When the second response unit 65 receives the request to transmit the sensor values, the second response unit 65 reads the sensor values stored in the register 63 and transmits the read sensor values as a response. By doing this, the second response unit 65 operates independently from the management unit 61. Accordingly, even when the management unit 61 does not normally operate, the sensor values are transmitted to the monitoring device 21 by the second response unit 65 as a response. Therefore, the monitoring device 21 may check whether the communication via the communication route 70-2 is normally performed.

When the management unit 61 does not normally operate, the sensor values stored in the register 63 are not normally updated. Therefore, the monitoring device 21 may check whether the BMC 26, that is, the management unit 61 normally operates, using the sensor values received as a response.

Figure 6:
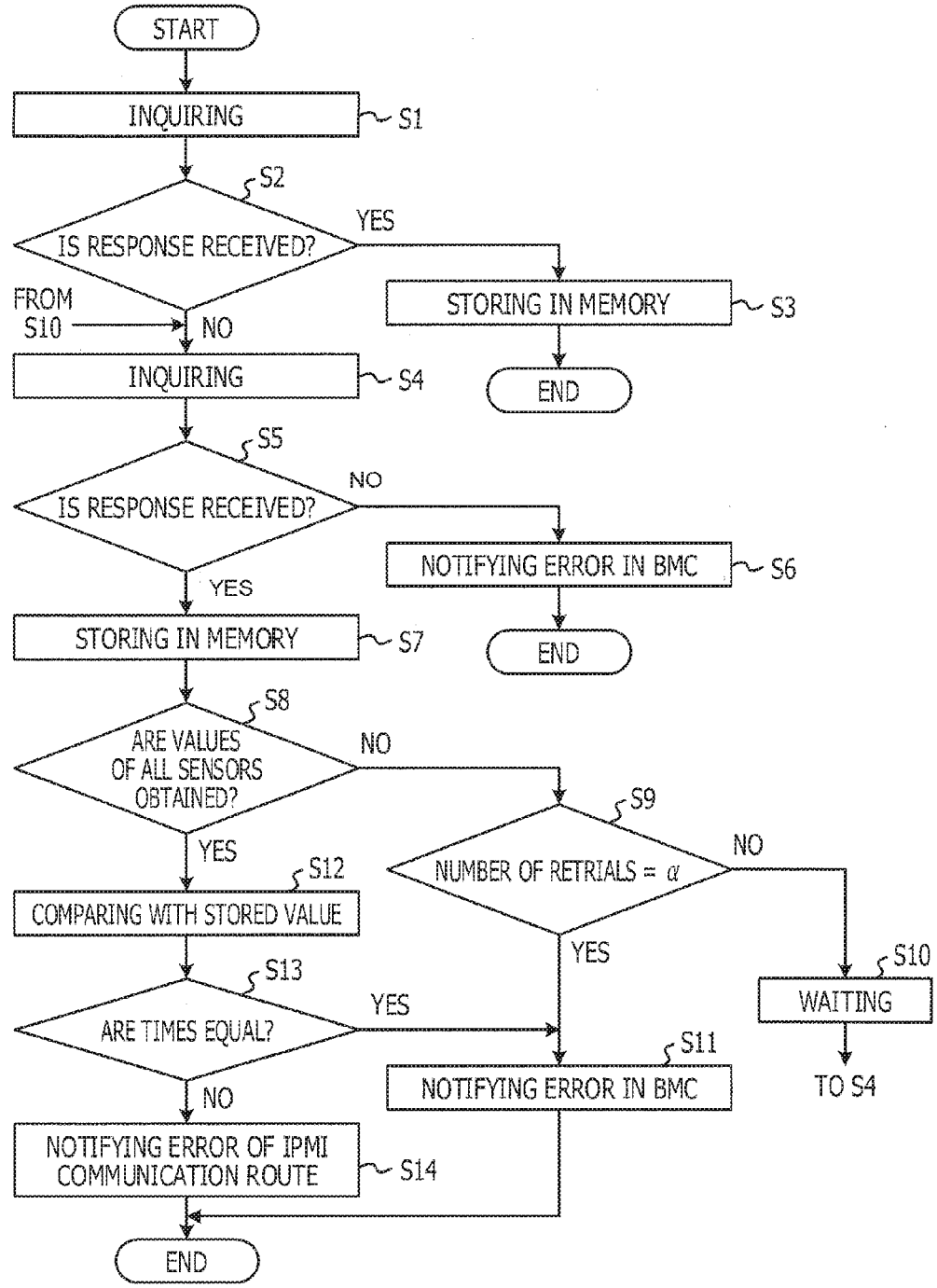
FIG. 6 is a flowchart of a monitoring process.

FIG. 6 is a flowchart of a monitoring process. A monitoring program which implements the monitoring device 21 causes the CPU 21 to regularly perform the monitoring process to monitor the state of the BMC 26 and notify the monitoring result to the terminal device 3 if necessary. Next, the monitoring process implemented by executing a monitoring program will be described in detail with reference to FIG. 6.

The CPU 21 first makes inquiry to the BMC 26 to request the sensor values via communication using the IPMI (S1). The CPU 21 determines whether a response to the inquiry is received from the BMC 26 (S2). When the response is not received until a predetermined period of time has elapsed after the inquiry is transmitted, the determination result at S2 is "NO" and the process goes to S4. When the response is received before the predetermined time has elapsed, the determination result at S2 is "YES" and the process goes to S3.

When the determination at S2 is "YES", the CPU 21 stores the sensor values received as the response in the memory 22 (S3). Thereafter, the monitoring process ends. As the sensor values are received, it may be considered that the BMC 26 normally operates.

When the determination at S2 is "NO", the CPU 21 makes inquiry to the BMC 26 to request the sensor values via communication using a communication specification other than the IPMI (S4). The CPU 21 determines whether a response to the inquiry is received from the BMC 26 at (S5). When the response is not received until a predetermined period of time has elapsed after the inquiry is transmitted, the determination result at S5 is "NO" and the process goes to S6. When the response is received before the predetermined period of time has elapsed, the determination result at S5 is "YES" and the process goes to S7.

The transfer of the process to S6 indicates that responses are not obtained for both inquiries using communication routes 70-1 and 70-2. A possibility that errors related to the communication routes 70-1 and 70-2 simultaneously occur is very low. In this respect, when the determination at S5 is "NO", the CPU 21 notifies the terminal device 3 that an error occurs in the BMC 26 (S6). Thereafter, the monitoring process ends. Notification to the terminal device 3 may be performed using a known technology such as a mail or a simple network management protocol (SNMP) trap. When re-initiation of the BMC 26 is available in the server 1 while executing the OS (active state), an administrator may re-initiate only the BMC 26 in response to this notification. By the re-initiation, the administrator may check whether an error occurs due to a program executed by the BMC 26. When the BMC 26 does not normally operate even though the re-initiation is performed, the administrator may determine that an error occurs in the BMC 26 or errors related with the two communication routes 70-1 and 70-2 simultaneously occur.

When the determination at S5 is "YES", the CPU 21 stores the sensor values received as the response in the memory 22 in order to check the contents thereof (S7). The CPU 21 determines whether the values of all the sensors 31 defined in the SDR information 26*cb* are included, by referring to the stored sensor values (S8). When the values of all the sensors 31 defined in the SDR information 26*cb* are included, determination result at S8 is "YES" and the process goes to S12. When the values of some sensors 31 defined in the SDR information 26*cb* are not included, determination result at S8 is "NO" and the process goes to S9.

There is a possibility that the BMC 26 may not obtain values from some sensors 31, or values of certain sensors 31 may disappear during the communication. Therefore, in the present embodiment, retrial is performed to request to retransmit the sensor values, for which a predetermined number of times is set as an upper limit for a retransmission request. The number of times set as the upper limit is denoted by "a" in FIG. 6.

When the determination at S8 is "NO", the CPU 21 determines whether the number of retrials is equal to the upper limit a (S9). When the retrial is attempted until the number of retrials reaches the upper limit a, the determination result at S9 is "YES" and the process goes to S11. When the number of retrials does not reach the upper limit a, the determination result at S9 is "NO" and the process goes to S10.

When the determination at S9 is "NO", the CPU 21 waits until a predetermined time elapses (S10). The time is equal to or longer than the time interval when the BMC 26 obtains the values of the sensors 31. After the time has elapsed, the process returns to S4 and accordingly, performs the retrial.

When the determination at S9 is "YES", the CPU 21 notifies the error of the BMC 26 to the terminal device 3 (S11). After the notification, the monitoring process ends.

When the determination at S8 is "YES", the CPU 21 compares the values of the sensors 31, for example, the time stamps, stored at previously performed S7 with time stamps of the sensors 31 stored before the previous execution of S7 (S12). The values of the sensors 31 compared with the values of the sensors 31 stored at the previously performed S7 is the values of the sensors 31 stored at previously performed S3 or the values of sensors 31 stored at S7 performed just before the previously performed S7.

After the comparison, The CPU 21 determines whether there is a sensor 31 having the same time stamp, among the sensors 31, that is, a sensor 31 in which the time stamp is not updated (S13). When there is a sensor 31 of which the time stamp is not updated, the determination result at S13 is "YES" and the process goes to S11. When the time stamps are updated in all sensors 31, the determination result at S13 is "NO" and the process goes to S14.

The transfer to S14 indicates that the BMC 26 is normally obtaining the value of each of the sensors 31. Therefore, the reason why the sensor values are not obtained through the communication using the IPMI is highly likely that there is an error (trouble) related with the communication route 70-1. In this respect, the CPU 21 notifies the terminal device 3 that an error occurs in the communication route 70-1 (referred to as "IPMI communication route" in FIG. 6) (S14). Thereafter, the monitoring process ends.

In the present embodiment, the CPU 21 installed in the same SB 10 is adapted to monitor the state of the BMC 26, but a CPU installed in a different SB 10 or in a different location may monitor the state of a BMC 26 of each of one or more SBs 10. That is, one monitoring device may be adapted to monitor a plurality of BMCs (management devices), and the one monitoring device may be disposed outside the server 1.

In the present embodiment, the CPU 21 is adapted to monitor the state of the BMC 26 using a sensor value (including a time stamp) obtained from the BMC 26, but the data used for monitoring may be data other than the sensor value or the time stamp. The monitoring by the CPU 21 is performed by checking the contents of the sensor values (including the time stamps) received from the BMC 26, but the contents of the sensor values may be checked at a transmission side from which the sensor values are transmitted. That is, the CPU 21 receives a result obtained by checking the contents of the sensor values to determine the state of the BMC 26 and notifies the determination result to the terminal device 3.

In the present embodiment, the second response unit 65 solely transmits the sensor values, but the management unit 61 may control the second response unit 65 to transmit the sensor values as well. Even in a case where such a control is performed, when the errors related with the communication routes 70-1 and 70-2 do not simultaneously occur, it is possible to check whether the management unit 61 normally operates through the communication of the two communication routes 70-1 and 70-2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
 a system board;
 a monitoring device on the system board and including a processor;
 a baseboard management controller (BMC) on the system board; and
 a chipset on the system board configured to allow the processor of the monitoring device to communicate with the BMC through the chipset,
 the monitoring device, the BMC and the chipset thereby being on the same system board, wherein:
 the chipset includes a first interface configured to communicate with the BMC using a first protocol, and a second interface configured to communicate with the BMC using a second protocol different from the first protocol, and
 the processor of the monitoring device is configured to
 conduct a first communication with the BMC through the chipset via the first interface using the first protocol to obtain first data from the BMC,
 conduct a first determination to determine whether the first data was obtained through the first communication,
 conduct, when it is determined that the first data was not obtained through the first communication, a second communication with the BMC through the chipset via the second interface using the second protocol to obtain the first data from the BMC,
 conduct a second determination to determine whether the first data was obtained through the second communication, and
 output information on basis of a determination result of the second determination.

2. The information processing apparatus according to claim 1, wherein the BMC includes:
 a first storage unit,
 a second storage unit different from the first storage unit,
 a first communication unit configured to perform the first communication with the first interface of the chipset,
 a second communication unit configured to perform the second communication with the second interface of the chipset, and
 a processor configured to
 generate the first data,
 store the generated first data in the first storage unit and the second storage unit,
 conduct the first communication with the first interface of the chipset via the first communication unit to transmit the first data stored in the first storage unit, and
 conduct the second communication with the second interface of the chipset via the second communication unit to transmit the first data stored in the second storage unit.

3. The information processing apparatus according to claim 2, wherein
 the processor of the monitoring unit is configured to
 identify a part of the BMC based on the determination result, and output the information indicating the identified part.

4. A non-transitory computer-readable recording medium having stored therein a program for conducting communication in an information processing apparatus that includes a system board, a monitoring device on the system board and including a processor, a baseboard management controller (BMC) on the system board, and a chipset on the system board configured to allow the processor of the monitoring device to communicate with the BMC through the chipset and including a first interface configured to communicate with the BMC using a first protocol and a second interface configured to communicate with the BMC using a second protocol different from the first protocol, wherein the monitoring device, the BMC and the chipset are thereby on the same system board, the program, when executed by the processor of the monitoring device, causing the processor of the monitoring device to perform a process comprising:
  conducting a first communication with the BMC through the chipset via the first interface using the first protocol to obtain first data from the BMC;
  conducting a first determination to determine whether the first data was obtained through the first communication;
  conducting, when it is determined that the first data was not obtained through the first communication, a second communication with the BMC through the chipset via the second interface using the second protocol to obtain the first data from the BMC;
  conducting a second determination to determine whether the first data is was obtained through the second communication, and
  outputting information on basis of a determination result of the second determination.

5. A method for conducting communication in an information processing apparatus that includes a system board, a monitoring device on the system board and including a processor, a baseboard management controller (BMC) on the system board, and a chipset on the system board configured to allow the processor of the monitoring device to communicate with the BMC through the chipset and including a first interface configured to communicate with the BMC using a first protocol and a second interface configured to communicate with the BMC using a second protocol different from the first protocol, wherein the monitoring device, the BMC and the chipset are thereby on the same system board, the method comprising:
  conducting, by the processor included in the monitoring device, a first communication with the BMC through the chipset via the first interface using the first protocol to obtain first data from the BMC;
  conducting, by the processor included in the monitoring device, a first determination to determine whether the first data was obtained through the first communication;
  conducting, by the processor included in the monitoring device, when it is determined that the first data was not obtained through the first communication, a second communication with the BMC through the chipset via the second interface using the second protocol to obtain the first data from the BMC;
  conducting, by the processor included in the monitoring device, a second determination to determine whether the first data was obtained through the second communication, and
  outputting, by the processor included in the monitoring device, information on basis of a determination result of the second determination.

* * * * *